US010306288B2

(12) United States Patent
Blanchard et al.

(10) Patent No.: US 10,306,288 B2
(45) **Date of Patent: *May 28, 2019**

(54) APPARATUS AND METHOD FOR MANAGING MEDIA CONTENT DELIVERY FOR MULTIPLE COMMUNICATION DEVICES

(71) Applicant: AT&T INTELLECTUAL PROPERTY I, L.P., Atlanta, GA (US)

(72) Inventors: Harry E. Blanchard, Rumson, NJ (US); Jeffrey L. Brandt, Cedar Park, TX (US); Aaron Bangor, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/631,053

(22) Filed: Jun. 23, 2017

(65) Prior Publication Data

US 2017/0289604 A1 Oct. 5, 2017

Related U.S. Application Data

(63) Continuation of application No. 14/481,003, filed on Sep. 9, 2014, now Pat. No. 9,723,365, which is a (Continued)

(51) Int. Cl.
*H04N 5/445* (2011.01)
*H04N 21/414* (2011.01)
(Continued)

(52) U.S. Cl.
CPC ..... *H04N 21/41407* (2013.01); *H04L 67/306* (2013.01); *H04N 21/214* (2013.01); (Continued)

(58) Field of Classification Search
CPC .......... H04N 21/41407; H04N 21/214; H04N 21/4104; H04N 21/414; H04N 21/472
(Continued)

(56) References Cited

U.S. PATENT DOCUMENTS 7,114,167 B2 9/2006 Slemmer et al.
2002/0171762 A1 11/2002 Maxson et al.
(Continued)

*Primary Examiner* — Jivka A Rabovianski
(74) *Attorney, Agent, or Firm* — Guntin & Gust, PLC; Matthew Tropper

(57) ABSTRACT

A system incorporating teachings of the present disclosure may include, for example, a server having a controller to monitor for a first adjustment made by a first communication device associated with a user where the first communication device is capable of presenting media content and where the first adjustment is associated with the presentation of the media content, determine a second adjustment to be made to a second communication device associated with the user where the determination is based at least in part on the monitored first adjustment where the second adjustment is associated with the presentation of the media content and where the second communication device is a battery-operated mobile device, and wirelessly communicate adjustment information to the second communication device that is representative of the second adjustment, where the adjustment information is adapted for allowing the second communication device to perform the second adjustment. Other embodiments are disclosed.

20 Claims, 9 Drawing Sheets

Related U.S. Application Data continuation of application No. 12/259,490, filed on Oct. 28, 2008, now Pat. No. 8,862,659.

(51) Int. Cl.

| | |
|---|---|
| ***H04L 29/08*** | (2006.01) |
| ***H04N 21/214*** | (2011.01) |
| ***H04N 21/41*** | (2011.01) |
| ***H04N 21/472*** | (2011.01) |
| *H04L 29/06* | (2006.01) |

(52) U.S. Cl.

CPC ....... *H04N 21/4104* (2013.01); *H04N 21/414* (2013.01); *H04N 21/472* (2013.01); *H04L 65/1069* (2013.01)

(58) Field of Classification Search

USPC .......................................................... 725/38

See application file for complete search history.

(56) References Cited

U.S. PATENT DOCUMENTS

| | | | |
|---|---|---|---|
| 2003/0074088 | A1 | 4/2003 | Gonzales et al. |
| 2003/0083087 | A1 | 5/2003 | Ekl et al. |
| 2004/0100492 | A1 | 5/2004 | Mercs |
| 2004/0210647 | A1 | 10/2004 | Jin et al. |
| 2005/0289264 | A1 | 12/2005 | Illowsky et al. |
| 2006/0026302 | A1 | 2/2006 | Bennett et al. |
| 2007/0160018 | A1 | 7/2007 | Alve et al. |
| 2007/0217519 | A1 | 9/2007 | Murayama et al. |
| 2008/0060012 | A1 | 3/2008 | Rydenhag |
| 2008/0127254 | A1 | 5/2008 | Nakajima |
| 2008/0301779 | A1 | 12/2008 | Garg et al. |

100

SHO
SHS
130
VHO 1
VHO 2
VHO 3
VHO 4
VHO 5
VHO 6
ISP Network 132
VHS
ACCESS NETWORK
115
117
Satellite dish receiver 131
108
STB 106
G 104
Ctrl 107
STB 106
ISP Network 132
102
108
116
Remote Services

200

300

500

600

700

APPARATUS AND METHOD FOR MANAGING MEDIA CONTENT DELIVERY FOR MULTIPLE COMMUNICATION DEVICES

CROSS-REFERENCE TO RELATED APPLICATIONS

This application is a continuation of and claims priority to U.S. patent application Ser. No. 14/481,003, filed Sep. 9, 2014, which is a continuation of and claims priority to U.S. patent application Ser. No. 12/259,490, filed Oct. 28, 2008 (now U.S. Pat. No. 8,862,659). The contents of each of the foregoing are hereby incorporated by reference into this application as if set forth herein in full.

FIELD OF THE DISCLOSURE

The present disclosure relates generally to communication systems and more specifically to an apparatus and method for managing media content delivery for multiple communication devices.

BACKGROUND

Networks are continuously expanding their abilities to distribute media content to users, as well as their capabilities for presentation of the media content. Users often have multiple devices for presenting the media content, which can include fixed devices and mobile devices. These devices can have a wide variety of adjustable features for improving the viewing experience of the users.

DETAILED DESCRIPTION

Figure 1:
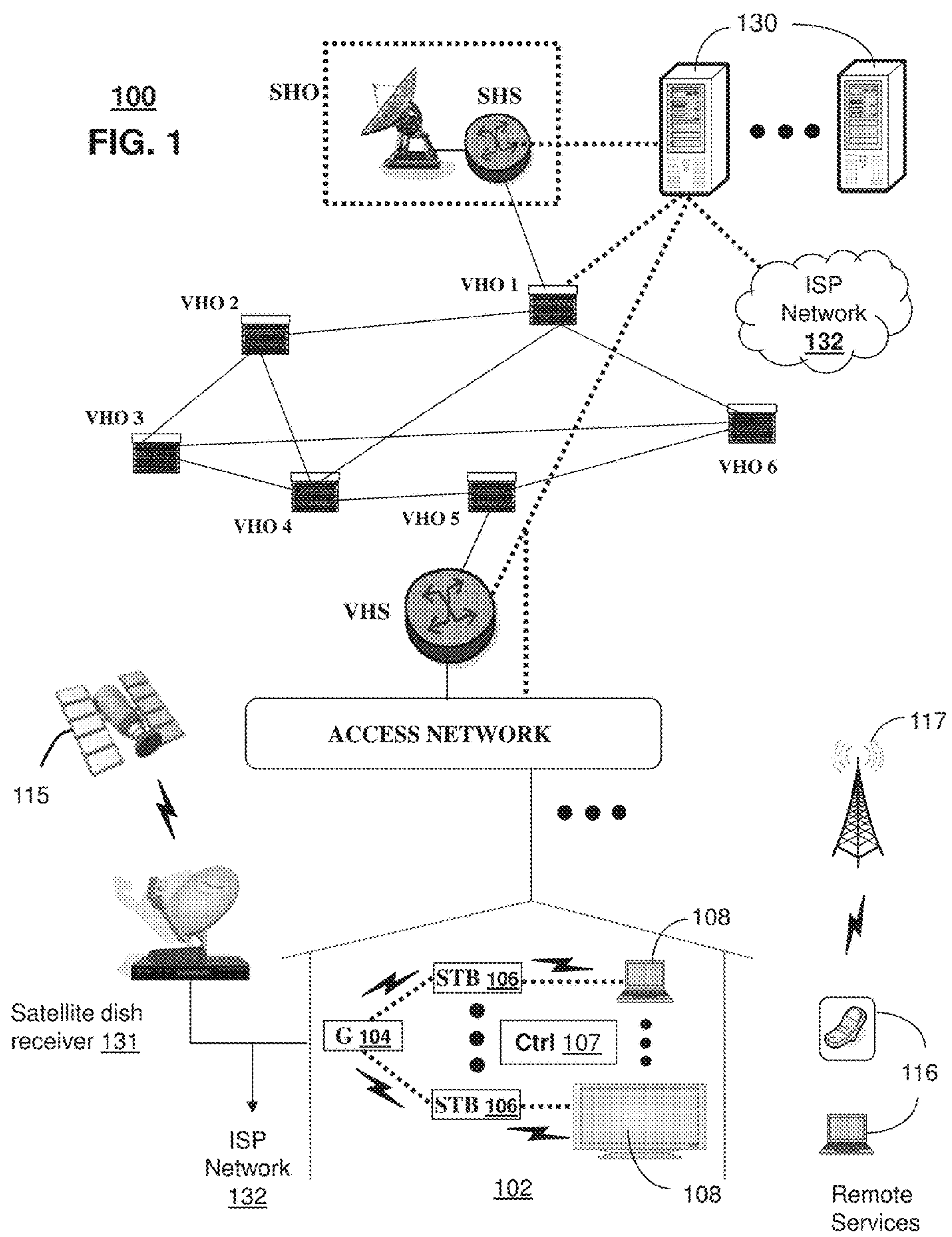
FIGS. 1-4 depict illustrative embodiments of communication systems that provide media services.

One embodiment of the present disclosure can entail a machine-readable storage medium loaded on a server of a network. The storage medium can include computer instructions for maintaining a user profile associated with a user and a plurality of communication devices of the user where each of the communication devices are capable of presenting media content, receiving adjustment data at the server from a first communication device of the plurality of communication devices that is sent over the network, where the adjustment data is representative of a first adjustment made to the first communication device, determining a second adjustment to be made to a second communication device of the plurality of communication devices based at least in part on the adjustment data and the user profile where the second communication device being a battery-operated mobile device, and communicating adjustment information over the network to the second communication device that is representative of the second adjustment, where the adjustment information is adapted for allowing the second communication device to perform the second adjustment, and where the first and second adjustments are associated with the presentation of the media content.

Another embodiment of the present disclosure can entail a server having a controller to monitor usage of a plurality of communication devices associated with a user where each of the communication devices are capable of presenting media content, maintain a user profile associated with the user and the plurality of communication devices, update the user profile based on the monitored usage, and provide one or more of the plurality of communication devices with access to the user profile, where the user profile comprises adjustment information that allows the one or more of the plurality of communication devices to make an adjustment that corresponds to another adjustment made by another of the plurality of communication devices, and where the adjustment and the another adjustment are associated with the presentation of the media content.

Yet another embodiment of the present disclosure can entail a server having a controller to monitor for a first adjustment made by a first communication device associated with a user where the first communication device is capable of presenting media content and where the first adjustment is associated with the presentation of the media content, determine a second adjustment to be made to a second communication device associated with the user where the determination is based at least in part on the monitored first adjustment where the second adjustment is associated with the presentation of the media content and where the second communication device is a battery-operated mobile device, and wirelessly communicate adjustment information to the second communication device that is representative of the second adjustment, where the adjustment information is adapted for allowing the second communication device to perform the second adjustment.

Yet another embodiment of the present disclosure can entail a communication device having a controller adapted to present media content, receive a request from a user of the communication device for a first adjustment to be performed, adjust the presentation of the media content by the communication device based on the first adjustment, and transmit adjustment data representative of the first adjustment to a server, where the adjustment data is adapted to allow the server to determine a second adjustment to be made by another communication device associated with the user, and where the second adjustment is associated with presentation of media content by the another communication device.

Yet another embodiment of the present disclosure can entail a method including obtaining adjustment data for a first communication device of a group of communication devices associated with a user where each of the group of communication devices is capable of presenting media content where the adjustment data is representative of a first adjustment made to the first communication device and where the first adjustment is associated with presentation of the media content by the first communication device, maintaining a user profile associated with the user and the group of communication devices of the user, determining a second adjustment to be made to a second communication device of the group of communication devices based at least in part on the adjustment data and the user profile where the second adjustment is associated with presentation of the media content by the second communication device, and communicating adjustment information to the second communication device that is representative of the second adjustment, where the adjustment information is adapted for allowing the second communication device to perform the second adjustment.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
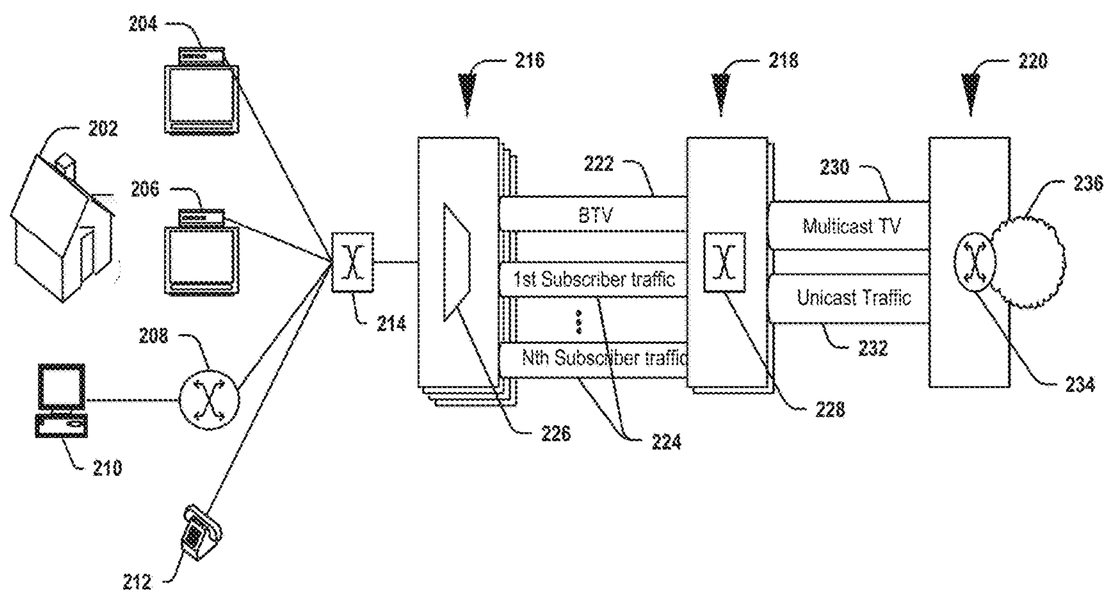

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
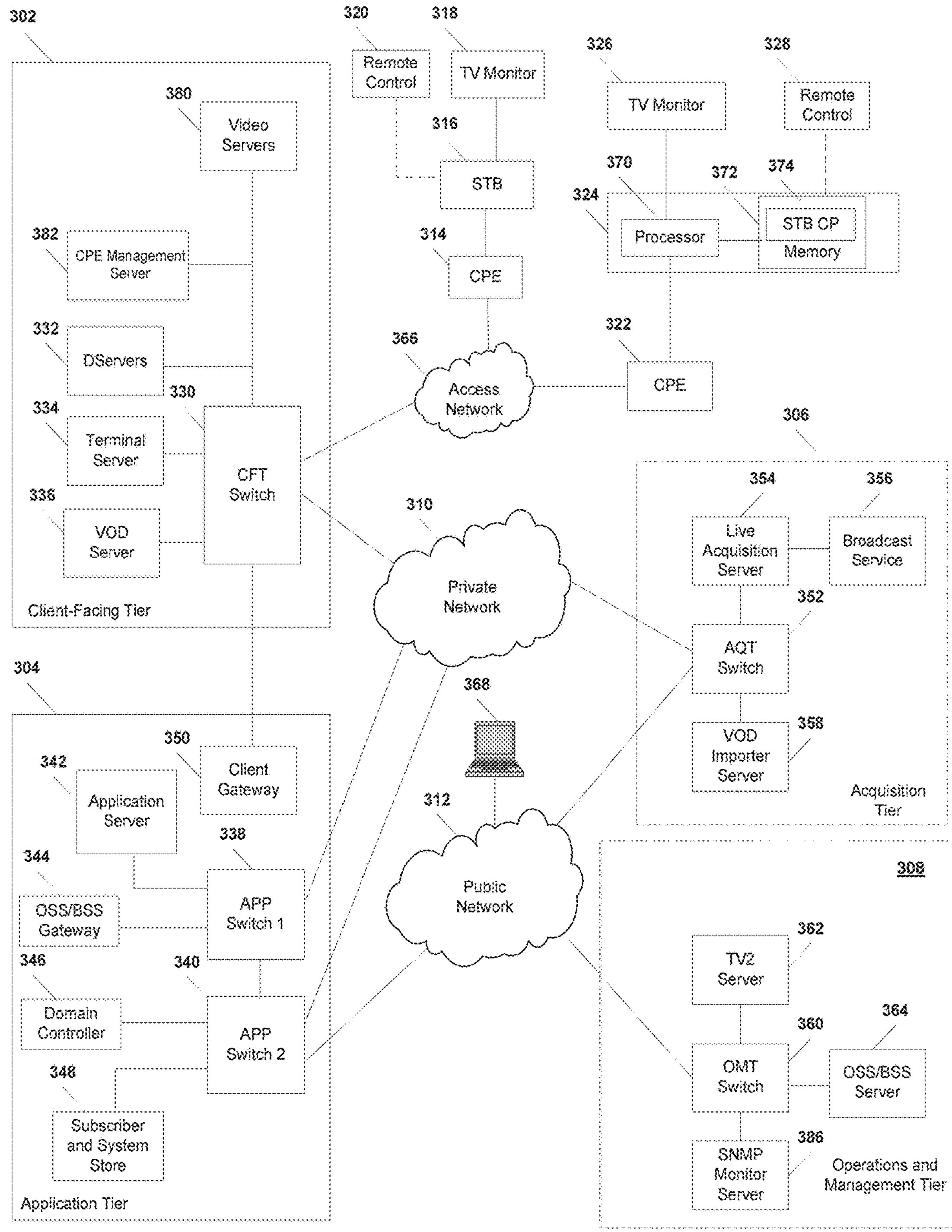

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
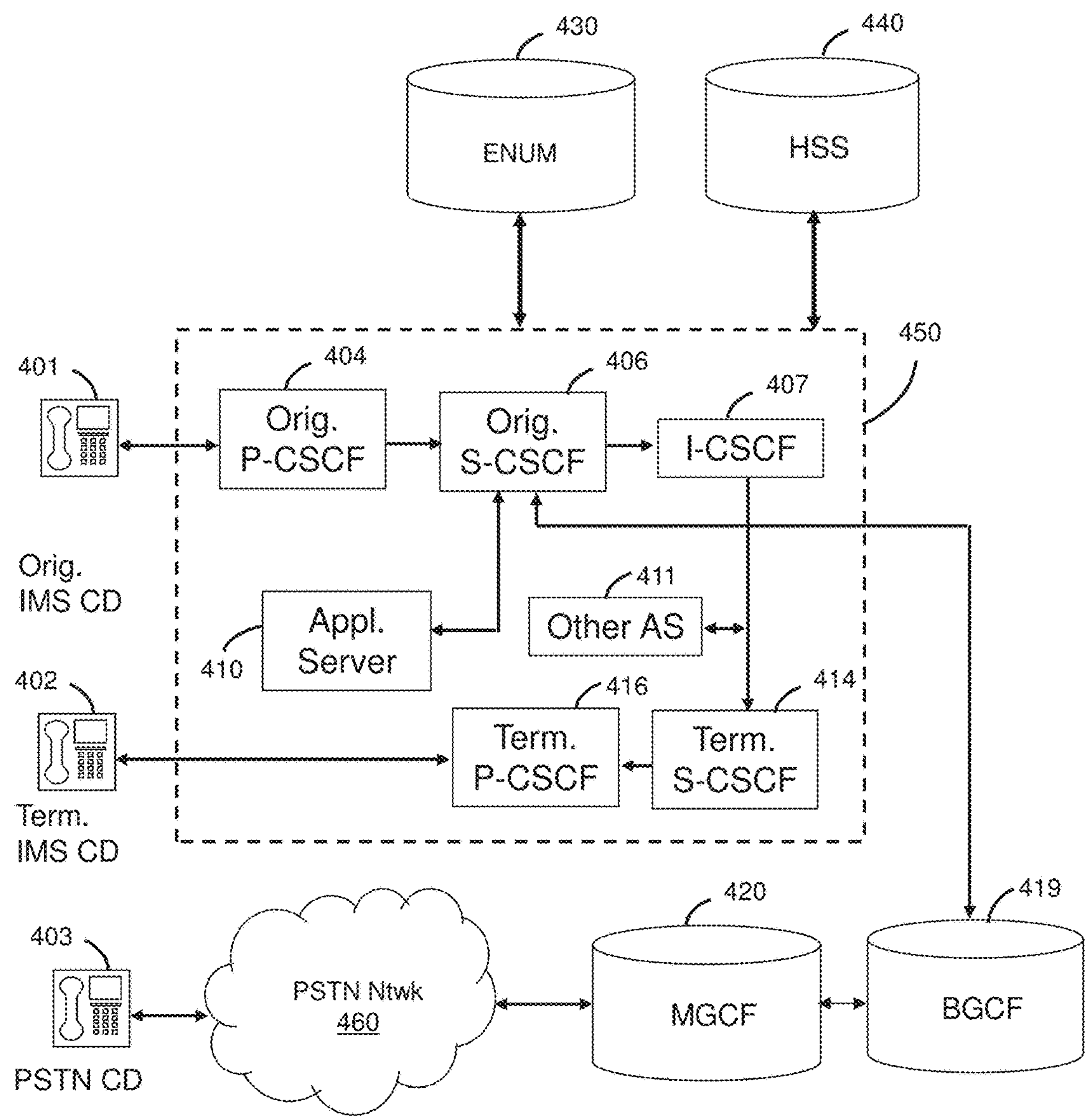

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
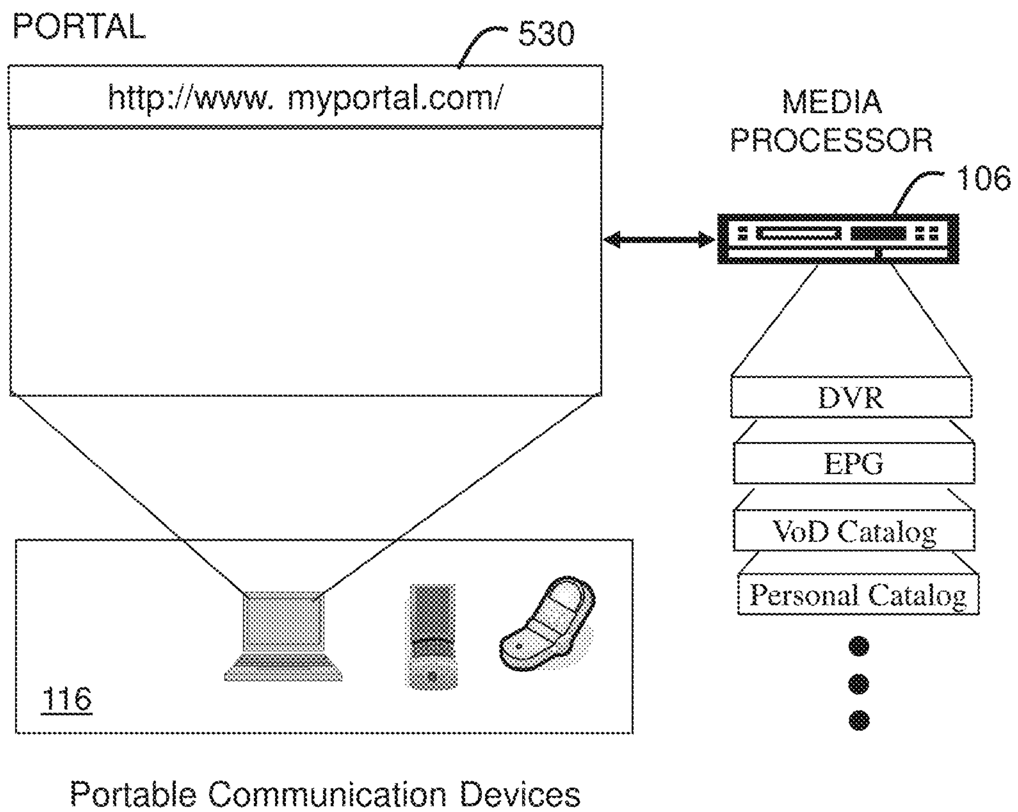
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 6:
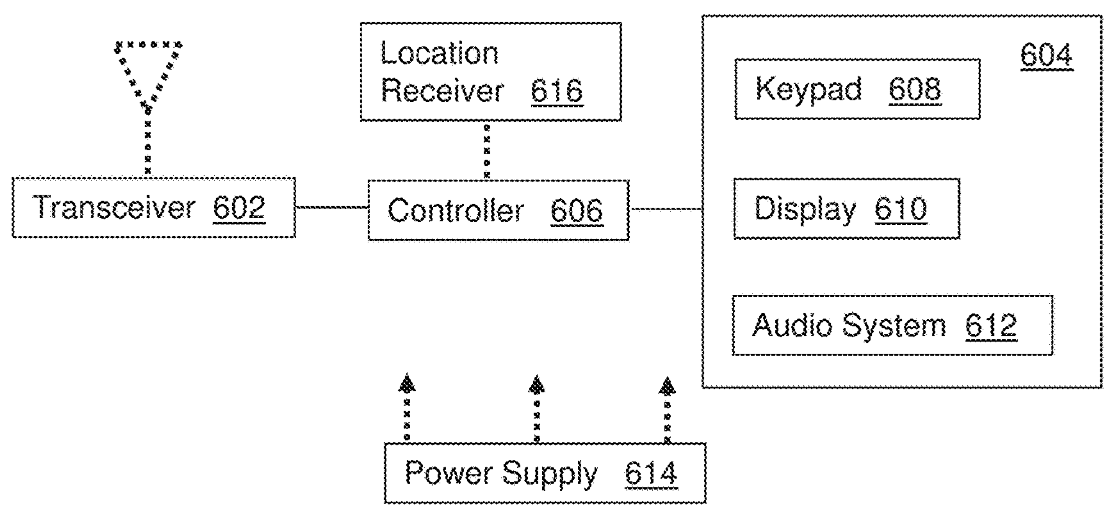
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, a location receiver 616, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. In one embodiment, the device 600 can be a battery-operated mobile multi-mode device. The location receiver 616 utilize common location technology such as a global positioning system (GPS) receiver for identifying a location of the communication device 100, thereby facilitating common location services such as navigation. The controller 606 can utilize computing technologies such as a microprocessor and/or digital signal processor (DSP) with associated storage memory such a Flash, ROM, RAM, SRAM, DRAM or other storage technologies.

Figure 7:
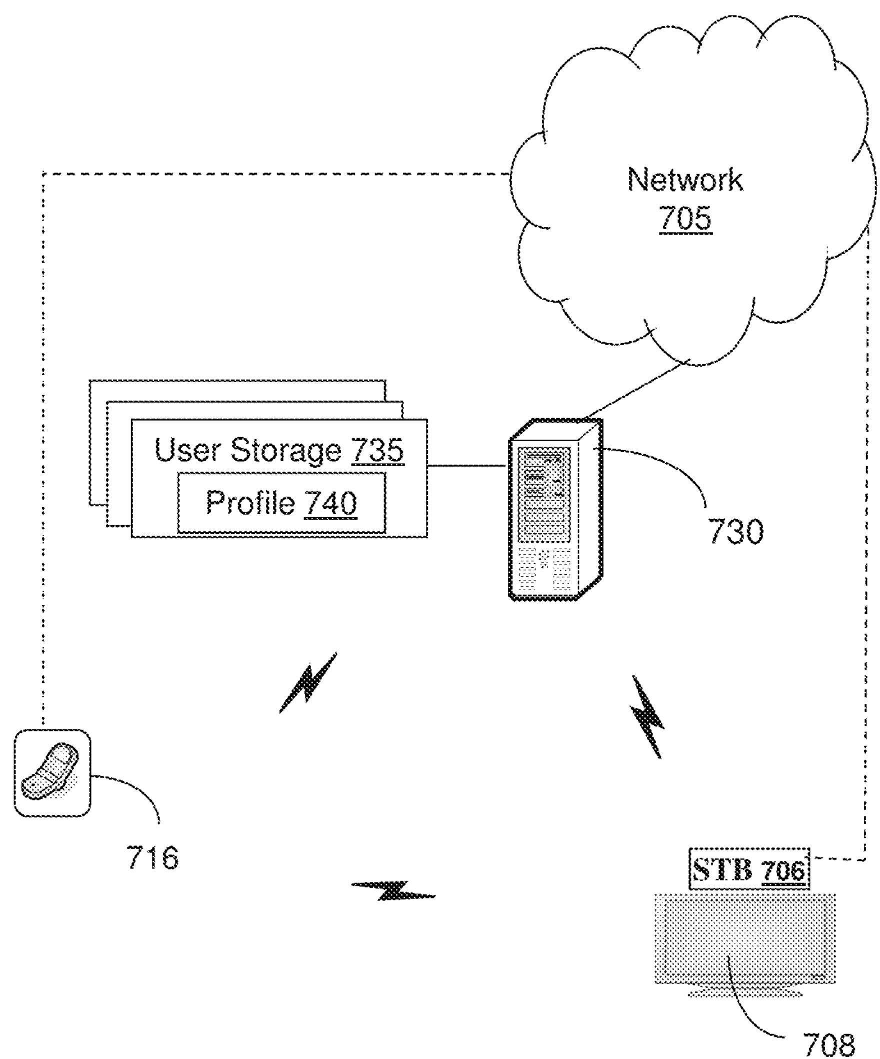
FIG. 7 depicts an illustrative embodiment of a communication system that provides media services.

FIG. 7 depicts an exemplary embodiment of a communication system 700 for delivering media content. Communication system 700 can be overlaid or operably coupled with communication systems 100-400 as another representative embodiment of said communication systems.

System 700 can include a network 705 for delivery of the media content between the provider equipment and the customer's equipment, such as an STB 706 having a display device 708, and a mobile and/or handheld communication device 716. The particular mode of communication for the STB 706 and/or the device 716 can vary and can include wired and/or wireless modes. A number of network devices, including DSLAM's, service routers and Ethernet switches, can be utilized for transporting the signals along and from the network 705. The network 705 can utilize a number of connection structures for providing a communication link between the network devices and the STB 706 and/or the device 716, including twisted pair lines, fiber lines and/or wireless connections.

System 700 can include a server 730 having a memory, such as a database, that can be used for establishing and maintaining user storage 735. The user storage 735 can be associated with one or more users of the network 705, the STB 706 and/or the device 716, including individual users and/or groups of users. The user storage 735 can store, or otherwise provide access to, user information, including service plans, channel layouts, last channel watched, program recording schedules, favorite channel selections, blocked channels, rented movies or other playable, prerecorded content that was purchased or selected, current channel tuning information for one or more viewing screens that are associated with the user, and so forth. For example, the viewing screens can be for multiple communication devices 716 that are turned on. In one embodiment, the viewing screens can be for the same communication device, such as a picture-in-picture display configuration.

In one embodiment, the user storage 735 can include a user profile 740 that includes some or all of the information described above, as well as other information such as identification information associated with the user and/or the user's communication devices, and user preferences such as through monitored behavior and history of the user or user pre-selections. In another embodiment, the user profile 740 can be imported in whole or in part from other sources, such as the STB 706 or a third party network, including previous service providers. In one embodiment, the user storage 735 can be a group storage for multiple users, such as users associated with a residence or a business entity, which has a plurality of individual user profiles 740 associated with each of the users. While system 700 depicts the server 730 storing the user storage 735 in a centralized fashion, it should be understood by one of ordinary skill in the art that the present disclosure contemplates other configurations, including distributed configurations, being applied to system 700.

The server 730 can provide settings and other user information associated with user storage 735 and user profile 740 to one or more communication devices associated with the user including mobile device 716 and STB 706. The server 730 can be in communication with each of the mobile device(s) 716 and STB(s) 706 to receive data associated with the settings and other user information. The data can be raw data that is manipulated or otherwise processed by the server 730 to determine the settings, user information and/or adjustments thereto. In another embodiment, the data can be in a format that facilitates storage of the settings, user information and/or adjustments thereto in the user storage 735 with little or no manipulation or processing being required of the server 730.

In one embodiment, the server 730 can serve the settings, user information and/or adjustments thereto to home and mobile phone networks, such that any change or addition a user makes to a corresponding communication device (such as STB 706 or mobile device 716) can be promptly available in both the mobile and home environments. While this exemplary embodiment describes a home network, it should be understood that other network environments are also contemplated including fixed locations associated with businesses.

In another embodiment, recorded or DVR content can be stored in the server 730 and/or the server can provide pointers to selected content which can be sent to a requesting communication device of the user by a separate DVR service. The exemplary embodiments can be performed by a single service provider or vendor, as well as through use of different service providers or vendors, including home and mobile services being different vendors where the service provider associated with the server 730 provides an agreed service coordination of benefit to the user. In one embodiment, the server 730 can be centered in the Internet, and the mobile and home service provider networks can contact the server through the Internet.

In one embodiment, the server 730 can allow a mobile user to watch television using the same channel line-up and selected favorite channels (such as being arranged in a priority configuration). In another embodiment, the user can choose to start viewing another communication device at the same channel they were tuned to with their previous communication device, such as where a user is watching a program at home and then desires to tune to the program when leaving the home. Recorded media content, including scheduled programming and/or rented media content such as VoD that are selected from one communication device, such as the STB 706 at the user's home, can be made available to other communication devices associated with the user, such as the mobile device 716.

In one embodiment, the mobile user can watch the same media content that is simultaneously being watched at home, including continuing to watch a show in the kitchen with the mobile device 716 when the user leaves the room with the main home television. In another embodiment, a home viewer can call a remote mobile device owner using the mobile device 716, and then share the media content being viewed, such as television programming In another embodiment, the server 730 can allow for multiple communication devices associated with the user and/or a group of users to be used in tandem. For example, a user can view their home television while holding the mobile device 716 which is displaying the picture-in-picture programming from the STB 706. The programming can be received from the server 730 and/or received directly from the STB 706. For example, the received content can be provided by one source, such as the STB 706, and supplemented by the other source, such as the server 730 or a transmission source associated with the server including other components of the network 705.

In one embodiment, the mobile device 716 can be a multi-mode device that is wirelessly in communication with the STB 706 through a first mode of communication, such as through a short-distance mode including WiMAX or WiFi. In another embodiment, keys on the mobile device can be captured and transmitted to the server 730, so that the user can browse through channels and then choose to show a selected channel on the big home screen via STB 706. In one embodiment, the keys on the mobile device 716 can perform some or all of the functions of a remote control associated with the STB 706. In another embodiment, the server 730 can provide a point, which can serve the key presses to the home television screen associated with the STB 706. In another embodiment, server 730 can communicate user information, including preferences, associated with other communication devices, such as a desktop computer, laptop, camera, and so forth.

In one embodiment, system 700 can provide for signal processing to be applied to the media content, such as according to an Advanced Television Systems Committee standard (ATSC) including the mobile handheld standard, so that code is embedded in the multiplex which develops lower profile versions of the main profile. In another embodiment, the standard can be based on or related to the ATSC Recommended Practice: E-VSB Implementation Guidelines, document ATSC A/112, which is the ATSC standards related to E-VSB (Enhanced Vestigial Sideband modulation), and provides guidelines to parameter selection and implementation scenarios; the disclosure of which is incorporated herein by reference.

For example, media content formatted using E-VSB or other multi-profiling formats with main and lower profile versions can be provided to the service provider, such as through transmission over the STL path to the SHS and to the VHO. The server 730 can then provide the viewers of the mobile device 716 (and/or other communication devices associated with the user) with a lower profile version of the media content which has a lower resolution but higher error correction data in order to maintain the link when there is a fault or potential determined. The fault monitoring can be performed by the server 730 or some other monitoring device, and/or can be performed by the mobile communication device 716. The fault or potential fault determination can be transmitted to the server 730 for adjusting the profiles to be transmitted. The particular error correction technique utilized for the various profiles can vary and can include FEC, such as block coding, convolution coding, concatenate coding, turbo coding and so forth. The server 730 can utilize the user information in the user storage 735 to determine the fault or potential fault, and can also utilize this user information for determining which, if any, lower profile versions of the media content are to be provided to the mobile device 716.

Figure 8:
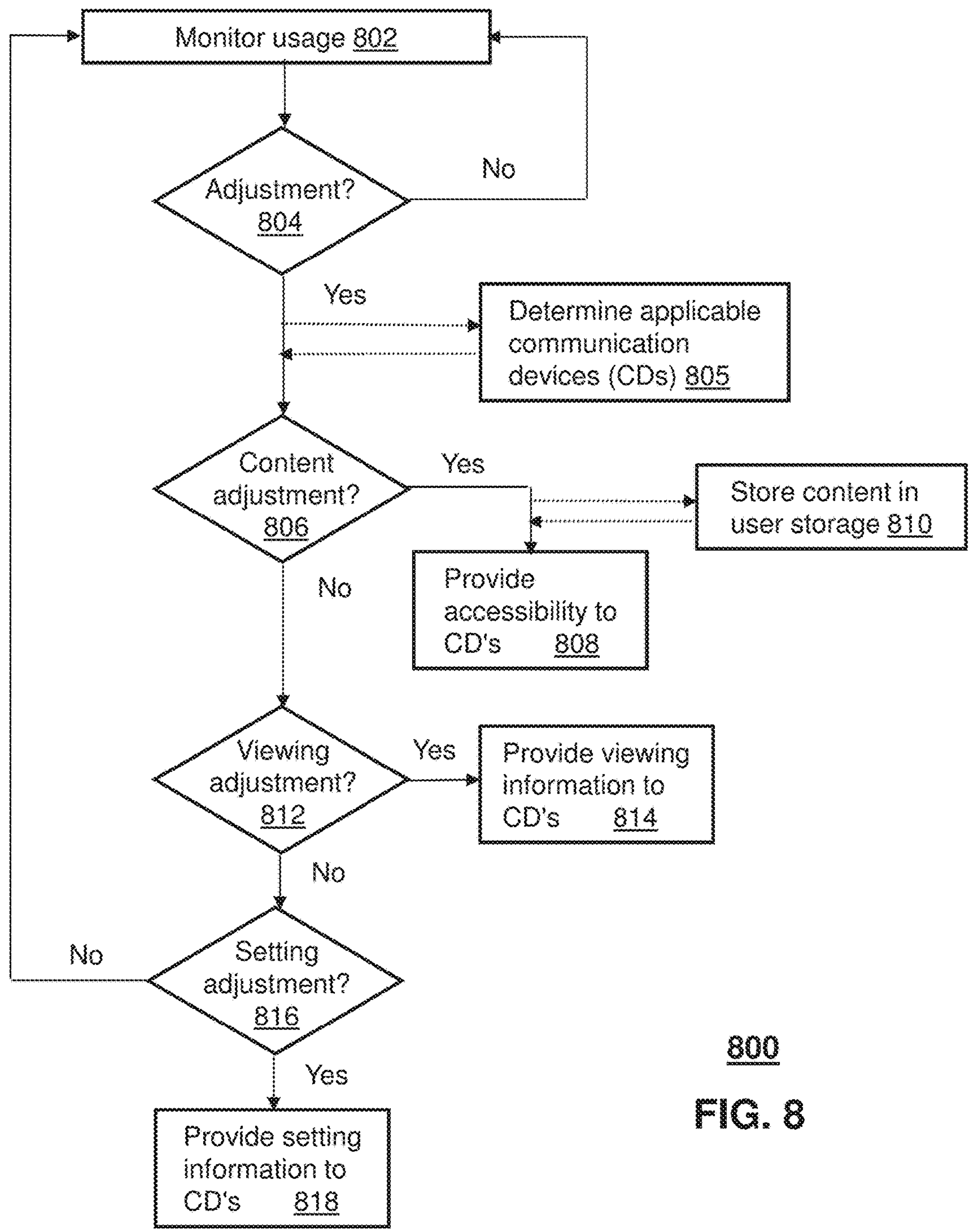
FIG. 8 depicts an illustrative embodiment of a method operating in portions of the communication systems of FIGS. 1-4 and 7.

FIG. 8 depicts an illustrative method 800 operating in portions of communication systems 100-400 and 700, including using server 730 of system 700. Method 800 can begin with step 802 in which the server 730 can monitor for usage of the communication devices associated with a user, such as the STB 706 and the mobile device 716, and in step 804 determine if there was an adjustment to the usage. The particular monitoring technique can vary and can include each of the communication devices providing data to the server 730 based on defined usage events, such as powering up, changing channels, changing settings, recording content, scheduling recording of content, deleting recorded content, blocking channels, utilizing picture-in-picture viewing, and so forth. The present disclosure also contemplates the server 730 retrieving or otherwise requesting the user information, whether or not limited to adjustments thereto, from the communication devices or other network elements in communication with the devices.

In one embodiment, the data provided to the server 730 can be representative of a change or adjustment to usage, rather than a complete profile of the usage. For instance, a communication device can transmit data representing that a setting, such as the resolution, has been modified, which includes the new resolution, rather than providing all of the setting information for the device to the server. In this example, the server 730 can then incrementally update the user storage 735 based on adjustments to user information rather than processing all of the user information each time an adjustment is made.

In one embodiment in step 805, the server 730 can determine applicable or target communication devices associated with a user for which method 800 is to be applied. The determination can be based on the user storage 735, including the user profile 740, and/or can be based on other sources of user preference information, including selections made by the user in response to a query from the server 730 or other component of system 700. For example, upon powering up a communication device, the user can be asked whether the device should be included in the configuration or other steps of method 800. The request presented to the user can vary and can include asking whether the communication device is to be included in the user's coordination group and/or can ask for more particular preferences, such as what types of coordination should the particular device be involved in, such as channel layouts, display settings, last channel watched, blocked channels, and so forth.

In step 806, the server 730 can determine if a content adjustment has been made on a user's communication device that is being viewed. If the content adjustment has been made then in step 808 the server 730 can provide the applicable communication devices of the user with access to the content. For instance, if a user selects a movie from VoD or records scheduled programming then that content can be made available to the other applicable communication devices, including the mobile device 716. In one embodiment in step 810, content that is being preserved or selectively accessed by one communication device, such as VoD, purchasing, and recording, can be stored by the server 730 in the user storage 735 to facilitate access by the other applicable communication devices associated with the user.

In step 812, the server 730 can determine if there has been a viewing adjustment for one of the user's communication devices, which can include changing of channels, playing of recorded content use of picture-in-picture configuration, and so forth. In step 814, the viewing information can be provided to the applicable communication devices of the user for a corresponding adjustment to viewing. For example, viewing information corresponding to the last channel being viewed on a first communication device, such as the STB 706, can be provided to, or otherwise made available for, another applicable communication device of the user, such as mobile device 716. In this example, the user can then power up the mobile device 716 and continue viewing the media content without the need for searching through channels to find the programming In another embodiment, viewing information corresponding to the programming being viewed in a picture-in-picture configuration on a first communication device, such as the display device of STB 706, can be provided to, or otherwise made available for, another applicable communication device of the user, such as mobile device 716. In this example, the user can then power up the mobile device 716 to view the programming so that the full display can be utilized by the STB while the mobile device is used to view the other programming In step 816, the server 730 can determine if a setting adjustment has been made on a user's communication device that is being viewed. If the setting adjustment has been made then in step 818 the server 730 can provide the applicable communication devices of the user with the setting information so that the device can apply the new setting. For instance, if a user adjusts the resolution of programming viewed on a display device of the STB 706, this setting adjustment can be provided to, or otherwise made available for, the mobile device 716 so that it can also adjust its resolution. Various setting adjustments of a first communication device of the user can be provided to, or otherwise made available for, other applicable communication devices of the user, including visually-based adjustment, audio-based adjustments, and so forth. For instance, a user may adjust the sound (such as treble, bass, and so forth) of music being listened to on a music channel of the STB 706. Method 800 allows for that same adjustment to be applied, without intervention by the user, to the mobile device 716 in the event that the user continues to listen to the music but on the mobile device.

Upon reviewing the aforementioned embodiments, it would be evident to an artisan with ordinary skill in the art that said embodiments can be modified, reduced, or enhanced without departing from the scope and spirit of the claims described below. For example, the media content can be associated with video games. For instance, a monitored viewing adjustment can include events associated with video games, such as the playing of a video game. The user information can include video game preferences and/or on-going games. A user can utilize method 800 so that a video game being played on a first communication device, such as through STB 706 and its display device, can be continued on a second communication device, such as mobile device 716. User information associated with the video game, including progress, can be maintained by the server 730 so that the user can continue with the video game from the other applicable communication device.

Server 730 also provides for selective application of adjustments to the applicable other communication devices. For instance, an increase in resolution for the STB 706 may not be practical for a particular handheld device 716. The server 730 can selectively provide for the coordination of adjustments based on a number of factors, including preferences in the user storage 735, information provided directly by the user, and/or other data, including parameters associated with the delivery of content that may effect the content. In one embodiment, coordinating a change of settings between the STB 706 and the mobile device 716 can be made dependent on the capability of the mobile device to provide the content using the particular setting. The capability can be determined in part on conditions associated with the network 705 or delivery of the content, such as where a device is in jeopardy of losing signal lock and the coordination requires increasing resolution. In this example, the server 730 and/or other components of the system, including the receiving communication device, can determine that adjusting the setting is not desired.

Other suitable modifications can be applied to the present disclosure without departing from the scope of the claims below. Accordingly, the reader is directed to the claims section for a fuller understanding of the breadth and scope of the present disclosure.

Figure 9:
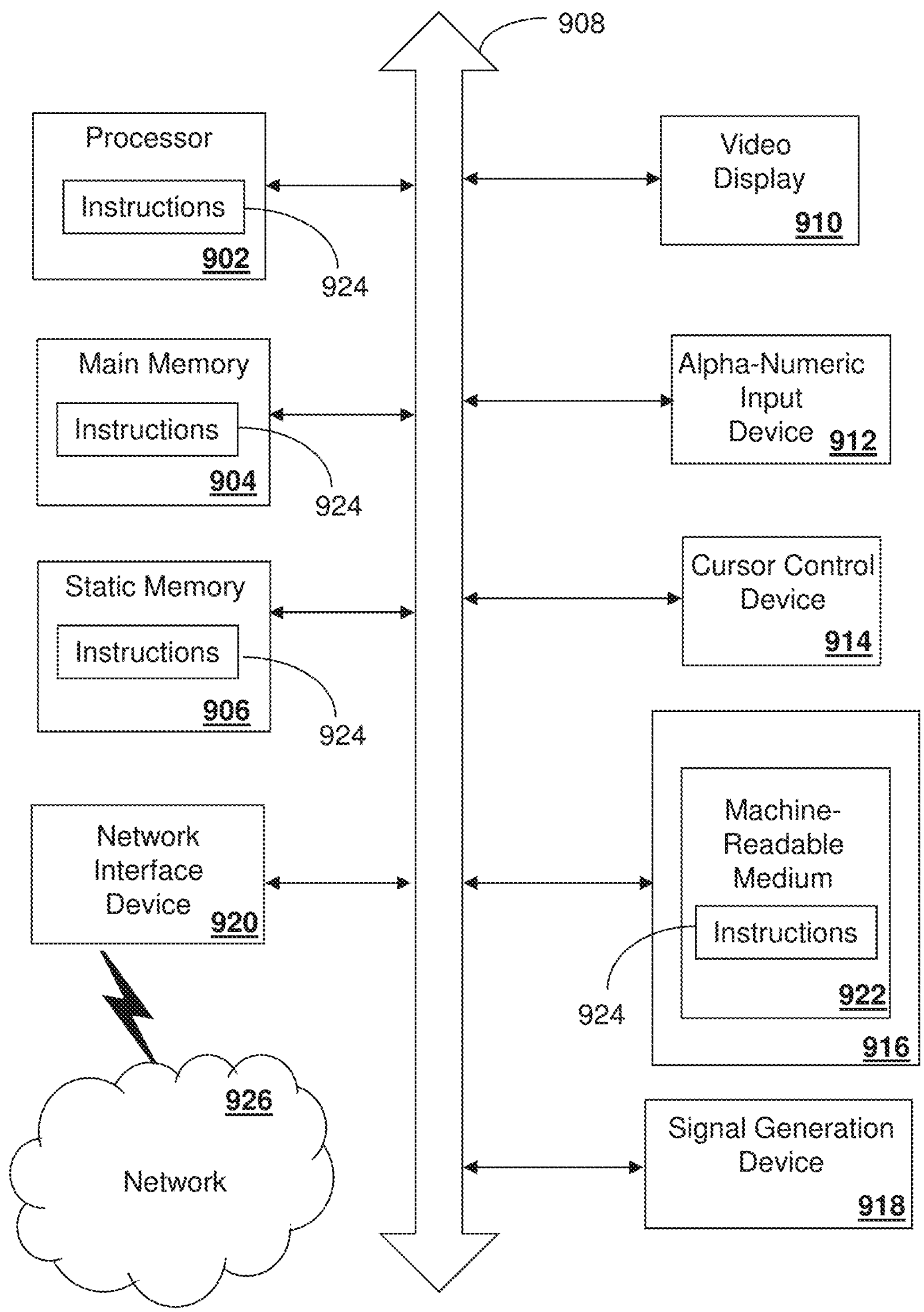
FIG. 9 is a diagrammatic representation of a machine in the form of a computer system within which a set of instructions, when executed, may cause the machine to perform any one or more of the methodologies discussed herein.

FIG. 9 depicts an illustrative diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (such as a central processing unit (CPU)), a graphics processing unit (GPU, or both), a main memory 904 and a static memory 906, which communicate with each other via a bus 908. The computer system 900 may further include a video display unit 910 (such as a liquid crystal display (LCD)), a flat panel, a solid state display, or a cathode ray tube (CRT)). The computer system 900 may include an input device 912 (such as a keyboard), a cursor control device 914 (such as a mouse), a disk drive unit 916, a signal generation device 918 (such as a speaker or remote control) and a network interface device 920.

The disk drive unit 916 may include a computer-readable medium 922 on which is stored one or more sets of instructions (such as software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the computer-readable medium 922 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as aseparately claimed subject matter.

What is claimed is:

1. A device, comprising:

a processing system including a processor; and a memory that stores executable instructions that, when executed by the processing system, facilitate performance of operations, the operations comprising:

obtaining coordination information from each communication device in a coordination group, wherein the coordination group comprises a plurality of communication devices utilized by a user which are to have settings coordinated, wherein the settings are coordinated according to types of coordination to be applied to each communication device, wherein the types of coordination comprise selection of a media channel, and wherein each of the plurality of communication devices of the coordination group is included in the coordination group upon a powering-up of a respective communication device;

obtaining first adjustment data representative of a first adjustment made to a first communication device of the coordination group, the first adjustment associated with presentation of media content by the first communication device, the first adjustment associated with changing at the first communication device from a previously viewed media channel to a subsequently viewed media channel;

determining a second adjustment to be made to a second communication device of the coordination group based on the first adjustment data indicating the change from the previously viewed media channel to the subsequently viewed media channel, wherein the second adjustment is associated with presentation of the media content by the second communication device, and wherein the second adjustment is associated with changing at the second communication device to the subsequently viewed media channel indicated by the first adjustment data; and communicating adjustment information representative of the second adjustment to the second communication device to enable the second communication device to perform the second adjustment upon powering-up of the second communication device.

2. The device of claim 1, wherein the operations further comprise submitting a query to the user via a given communication device utilized by the user to determine whether the given communication device is to be included in the coordination group.

3. The device of claim 1, wherein the operations further comprise maintaining a user profile associated with the user and the plurality of communication devices of the coordination group, and wherein the determining the second adjustment is further based upon the user profile.

4. The device of claim 3, wherein the operations further comprise monitoring usage of the plurality of communication devices of the coordination group, resulting in monitored usage.

5. The device of claim 4, wherein the operations further comprise updating the user profile in accordance with the first adjustment, the second adjustment and the monitored usage.

6. The device of claim 4, wherein the user profile is maintained by incremental updates to the user profile based on the monitored usage.

7. The device of claim 1, wherein the second adjustment is performed responsive to the powering-up of the second communication device during the presentation of the media content by the first communication device.

8. The device of claim 1, wherein the types of coordination further comprise channel layouts, display settings, blocked channels, or combinations thereof.

9. The device of claim 1, wherein the first adjustment further corresponds to a first presentation adjustment of a first user interface of the first communication device, and the second adjustment further causes a second presentation adjustment of a second user interface of the second communication device.

10. The device of claim 1, wherein the operations further comprise:

storing media content of the first communication device, resulting in stored media content; and providing the second communication device with access to the stored media content.

11. The device of claim 1, wherein the second communication device is a multi-mode mobile device.

12. The device of claim 1, wherein a portion of a transmission path between the processing system and the second communication device for the adjustment information is a wireless link between the first communication device and the second communication device.

13. A non-transitory machine-readable storage medium comprising executable instructions that, when executed by a processing system including a processor, perform operations, the operations comprising:

requesting coordination information from each communication device in a coordination group, wherein the coordination group comprises a plurality of communication devices utilized by a user which are to have settings coordinated, wherein respective coordination information is directed to types of coordination to be applied to each communication device, wherein the types of coordination comprise selection of a media channel, and wherein each of the plurality of communication devices of the coordination group is included in the coordination group upon a powering-up of a respective communication device;

receiving first adjustment data representative of a first adjustment made to a first communication device of the coordination group, the first adjustment associated with presentation of media content by the first communication device, the first adjustment associated with changing at the first communication device from a first media channel that had been previously viewed by the user at the first communication device to a second media channel that is subsequently viewed by the user at the first communication device;

determining a second adjustment to be made to a second communication device of the coordination group, the second adjustment associated with presentation of the media content by the second communication device, the second adjustment associated with changing at the second communication device to the second media channel indicated by the first adjustment data; and transmitting second adjustment data representative of the second adjustment to the second communication device to enable the second communication device to perform the second adjustment upon powering-up of the second communication device.

14. The non-transitory machine-readable storage medium of claim 13, wherein the operations further comprise submitting a query to a given communication device utilized by the user, to determine whether the given communication device is to be included in the coordination group.

15. The non-transitory machine-readable storage medium of claim 13, wherein the operations further comprise maintaining a user profile associated with the user and the plurality of communication devices of the coordination group, and wherein the second adjustment is determined based on the first adjustment data and the user profile.

16. The non-transitory machine-readable storage medium of claim 15, wherein the operations further comprise:

monitoring usage of the plurality of communication devices of the coordination group, resulting in monitored usage, and updating the user profile in accordance with the first adjustment, the second adjustment and the monitored usage.

17. The non-transitory machine-readable storage medium of claim 13, wherein the second adjustment is performed responsive to the powering-up of the second communication device during the presentation of the media content by the first communication device.

18. A method, comprising:

obtaining, by a processing system including a processor, coordination information from each communication device in a coordination group, wherein the coordination information identifies types of coordination to be applied to each communication device in the coordination group, wherein the types of coordination comprise selection of a media channel, wherein the coordination group comprises a plurality of communication devices utilized by a user which are to have settings coordinated, and wherein each of the plurality of communication devices of the coordination group is included in the coordination group upon a powering-up of a respective communication device;

receiving, by the processing system, first adjustment information that represents a first adjustment made to a first communication device of the coordination group, wherein the first adjustment is associated with presentation of media content by the first communication device, and wherein the first adjustment is associated with changing from a previously viewed media channel at the first communication device to a subsequently viewed media channel at the first communication device;

determining, by the processing system, a second adjustment that is to be made to a second communication device of the coordination group, wherein the second adjustment is associated with presentation of the media content by the second communication device, and wherein the second adjustment is associated with changing at the second communication device to the subsequently viewed media channel that is indicated by the first adjustment information; and sending, by the processing system, second adjustment information that represents the second adjustment to the second communication device to facilitate the second communication device being able to perform the second adjustment upon powering-up of the second communication device.

19. The method of claim 18, further comprising submitting to the user, by the processing system, a query, wherein the query is submitted to the user via a given communication device utilized by the user to determine whether the given communication device is to be included in the coordination group.

20. The method of claim 18, further comprising:

maintaining, by the processing system, a user profile associated with the user and the plurality of communication devices of the coordination group;

monitoring, by the processing system, usage of the plurality of communication devices of the coordination group, resulting in a monitored usage; and updating, by the processing system, the user profile in accordance with the first adjustment, the second adjustment and the monitored usage.

* * * * *